United States Patent [19]

Pedro

[11] 4,019,292
[45] Apr. 26, 1977

[54] ROTARY STRUCTURE FOR THE SUPPORT OF LOADS

[76] Inventor: Enrique Pedro, 152, Via Julia, Barcelona, Spain

[22] Filed: June 19, 1975

[21] Appl. No.: 588,154

[30] Foreign Application Priority Data

June 25, 1974 Spain .................................. 427899

[52] U.S. Cl. ................................ 52/65; 52/169.1; 308/9
[51] Int. Cl.² ....................................... E04B 1/346
[58] Field of Search .................... 52/65, 169; 308/9

[56] References Cited

UNITED STATES PATENTS

| 3,144,903 | 8/1964 | Stockman | 308/9 X |
| 3,491,496 | 1/1970 | Johnston | 52/65 |
| 3,599,378 | 8/1971 | Kachnic | 52/65 X |
| 3,636,975 | 1/1972 | Kirkman et al. | 52/65 X |
| 3,855,755 | 12/1974 | Burdick | 52/65 |

FOREIGN PATENTS OR APPLICATIONS

| 1,532,474 | 6/1968 | France | 52/65 |

Primary Examiner—Price C. Faw, Jr.
Assistant Examiner—Carl D. Friedman

[57] ABSTRACT

A rotary structure for supporting loads to be rotated, having a fixed body with a peripheral portion, a hollow chamber and a liquid partially filling the chamber so that the movable body floats in the liquid in the chamber. The support structure includes rollers supported on the peripheral portion of the fixed body for circular movement thereover about a central vertical axis.

12 Claims, 9 Drawing Figures

ROTARY STRUCTURE FOR THE SUPPORT OF LOADS

The present invention refers to a structure designed to support loads of any magnitude and characterised by being rotatory about a vertical axis. The loads in question may consist of buildings, such as chalets and the like, including buildings of large dimensions, tanks, industrial, technical or scientific installations and, in general, any type of load, whether of small, medium or large magnitude, with alteration of the corresponding structure according to the dimensions of its components, but being based always on the same functional idea.

Another outstanding characteristic of the rotatory structure which is the object of this invention is that its rotation can be effected with a minimum of energy, due to the fact that the movable part of the installation is mounted on the fixed part by a system of fluid support which reduces almost to zero the friction between the two parts; by this means, one propulsion group of reduced power is sufficient to produce rotation of the movable part, from which may be derived important consequences from an economic as well as from a practical point of view.

Reducing the composition of the structure to its basic elements, the description of the same is as follows: 1. a static portion, anchored to the ground and shaped like a flattened receptacle after the manner of a saucepan, in plan circular or of any other configuration, made of reinforced concrete of sufficient thickness or of any other material, and supplied with the necessary reinforcement to withstand the forces to which it may be subjected; 2. a movable part, which shall have a shape similar to that of the fixed body, although this also may present a different configuration, fitting perfectly in the inside of the former, there being between the two a zone of separation noticeably uniform; and, 3, a coat of liquid in the last mentioned zone which shall act as a cushion sustaining the internal body, which thus remains floating in said liquid, which surrounds it completely, so that only a reduced force is then required to produce the rotatory movement of the interior body about its own vertical axis and inside the fixed body.

To facilitate the understanding of the invention drawings accompany the present application, in which is represented, by way of illustrative and not limiting example, a rotatory structure for the support of loads, in accordance with the principles of the invention.

Figure 1:
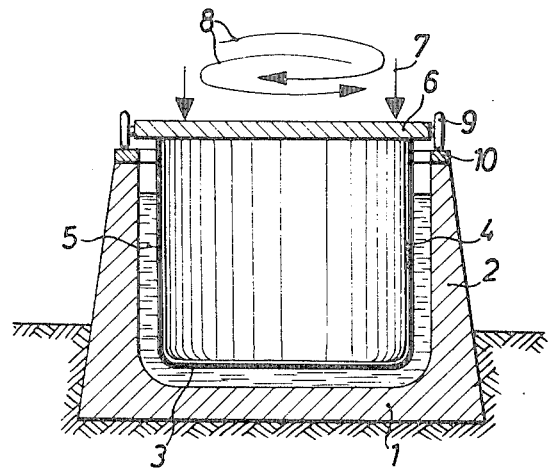
FIG. 1 is a diagrammatic illustration of the principle of the new structure, and serves to illustrate its operating basis.

A fixed body 1, generally in the form of a saucepan, is made of concrete or some other resistant and hermetic material, with its base firmly seated on the ground, by means of the necessary foundations, and base a lateral part -2- of adequate height and thickness there is a movable body 3 also in the form of a saucepan, with vertical walls -4- preferably cylindrical. Reference numeral 5 designates a coat of liquid separating the two bodies, the movable body floating in the liquid and being surrounded by the same laterally. There is an upper platform 6 on which may be placed loads of considerable weight as, represented by the arrows -7- in FIGS. 1 to 3, and to which it is desired to apply a rotation, indicated by the arrows -8-, in one direction or another, about a vertical axis also, there are elements 9 for rolling and for guidance on the edges of the sustaining platform -10-, on the edges of the fixed body. This is the elementary form of of the rotatory structure described, although for all practical purposes it would be advantageous to apply different variations, two of which appear in FIGS. 2 and 3 respectively.

Figure 2:
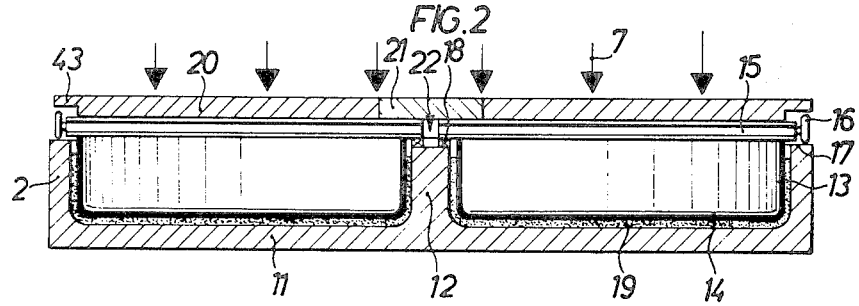
FIG. 2 is a representation of a possible way in which this invention may be carried out, showing the rotatory body as a disc.

In FIG. 2, number -11- represents the base of the fixed body, this time of larger diameter, and -12- is a central column extending from the bottom of the fixed body, while the movable body has cylindrical walls -13- a base -14- in the form of a crown, and central walls about the column -12-, supporting jointly the basic framework -15- whose edges carry the wheels -16- which facilitate its guided turning on the edges -17- of the cylindrical walls of the fixed body a ball bearing 18 is mounted on body 11-19 is an, intermediate coat of liquid of a composition, density and viscosity adecuate to each structure. A base plate 20, supported on framework -15- of small girders as afore-mentioned, a central part 21 of the movable plate, is preferably separable with respect to a device -22-.

Figure 3:
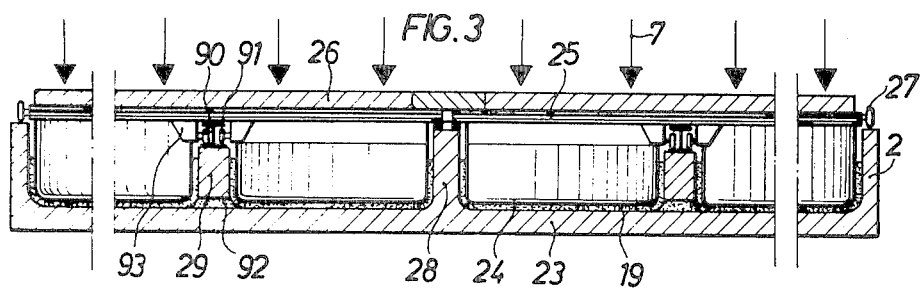
FIG. 3 is the representation of another rotatory structure in which the movable base may be of large dimensions, for which purpose it is equipped with intermediate supports to contribute to the distribution of the loads.
Figure 4:
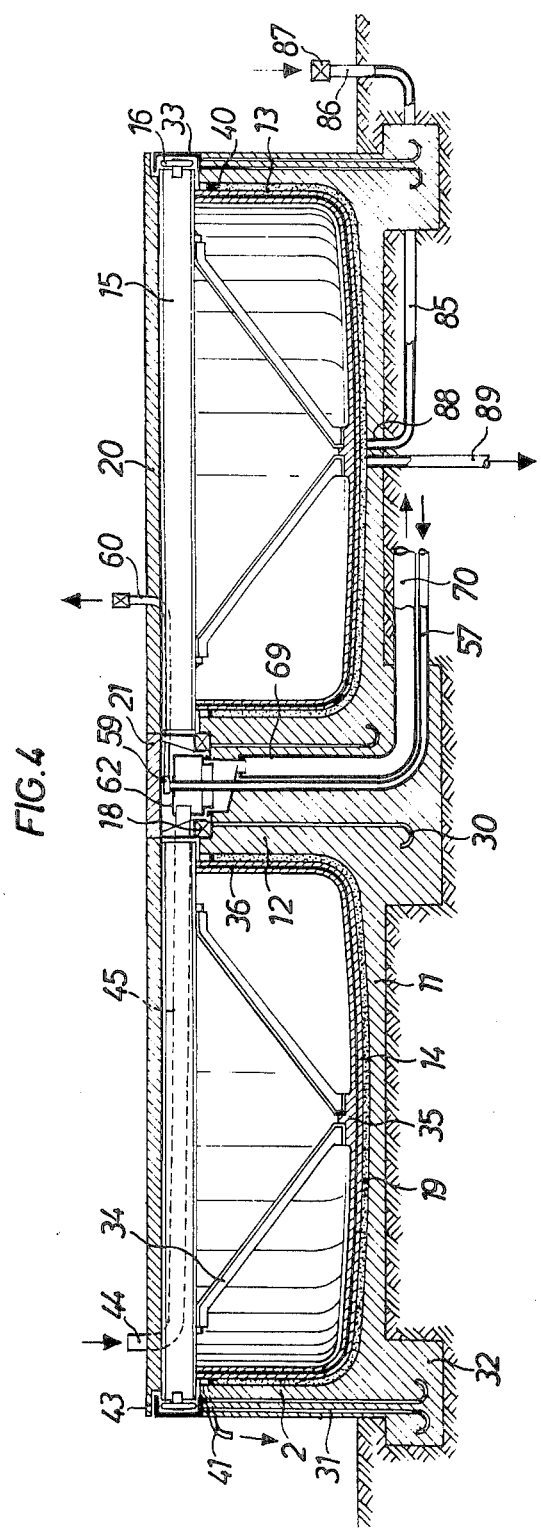
FIG. 4 is a larger scale view, sectioned through a vertical plane, of a structure whose essential functional components are detailed, while the FIG. 5 is plan projection, limited to a circular sector, of the construction itself.

In the version of FIG. 3, the base -23- of the fixed body is of large dimensions, and the movable body -24- consists of a series of bodies in ring form, the edges of common height of which sustain the carrying structure formed by the beams -25- disposed radially, on which the carrying plate -26-, is located, fitted with rolls -27- in its peripheral parts and with an orientation crown in its central part, corresponding to the central column -28-, while the annular elevations -29- of the base -23- give support and guidance to the structure -25-, whose lower face has projections -93- carrying trains of wheels -90- for the rolling support of the movable part upon the elevations -29-, which are provided with guiding and rolling elements formed by profiles -91- in the shape of an I or double T of adequate width.

The crown of orientation, in the central part, completely fixes the direction of movement of the platform, preventing any displacement of the same in respect of its ideal axis, and at the same time supports the central part of the small girders forming the radial support of the same.

This type of structure with intermediate supports will be adequate, for example, when the upper platform is of the order of 15 meters in diameter, approximately, in which case it would be normally difficult or not very practical to obtain a good rigidity with a single body for the movable part. Now, the sustaining part -25- formed by the radial girders should of course form a single body. The appropriate level of liquid should be the same in the different annular spaces occupied by the same, for which there are several passages -92- in the elevations -29- for communication between such spaces as to form vessels of equal height.

The central column -12- 95 reinforced by vertical armorings -30-, especially for the support of the bearing -18-, which should preferably be of the type known as crown of orientation; the lateral parts -2- are reinforced by vertical armorings -31- and supported on the zones -32- which together form a circular foundation; numeral 33 represents a, profile in form of C, disposed upon the part possessing the armorings -31- and designed to constitute a rolling track and at the same time a guide for the wheels -16- of the movable body; its upper fin serves as a guide for the wheels if, by any chance, the platform of the movable body should receive a thrust upwards greater than the load to be supported; oblique ties to 34 reinforce the radial structure formed by the beams -15-, starting from a central elevation extending from the interior of the movable body; an armoring 36 reinforces the movable body -13- in the part of it that is shaped like a saucepan. Girders 37 connect the radial beams 15 and in turn are connected to girders 38 to form poligons. A rod 39 couples each of the wheels -16- to one of the radial beams 15- of support; a coat 40 coat of non-volatile liquid, is deposited on the surface of the intermediate liquid -19-, to avoid, or at least reduce to a minimum, the evaporation of same; an, oblique tube 41 acts as an overflow, with its lower mounth -42- disposed laterally; edges 43 of the carrying plate -20-, project with respect to the fixed body and in plan may have any form of geometrical configuration; tubes 44 are provided for the elimination of residual waters, which run over an inclined span -45-, disposed radilly, having its mouth -46- in communication with the central part of the structure; a plate 47 connected to the radial beams -15- and to which is coupled another plate -48- by means of screws -49-, constitute a rigid system with which is associated the rolling device of the orientation crown type in the central part of the structure, there is a perpendicular extension 50 of the plate -48-, and -51- represents a screw to hold the crown -52- of the bearing, whose other crown -53- is joined, by means of a bolt -54-, to the circular plate -55- mounted on and within the fixed body; the cylindrical part -56- is disposed axially, together with the support edge of the wall -66- of a central collector -65-, whose other wall -67- extends into a mouth -68-, to which is coupled a tube -69- for discharge, whose extension -70- conducts the residual waters to another collector for their elimination.

In the unlikely case of breakage or damage to the crown of orientation, the separation of the circular piece -48-50-56- permits immediate access to the said crown. The circular piece may have holds for observation of the interior and central part in which the crown of orientation is found.

Entry of the necessary drinking water for all the needs of the installation, whether dwellings, commercial or industrial building, is effected by means of the conduit -57-, whose vertical span runs axially, surrounded and protected by the tubular wrapping -58- and communicates with the head valve -59-, which permits the turning of the lower part and the taking of radial derivations -60- for the various application points, provided with their valves.

The upper part -62- of the collecting body -65- turns with the movable body of the installation and closes hermetically with respect to the axial conduit by means of the annular seal -61- and with respect to the lower fixed body -66- by means of the seal -64- which is retained by the annular recess -63-.

Figure 5:
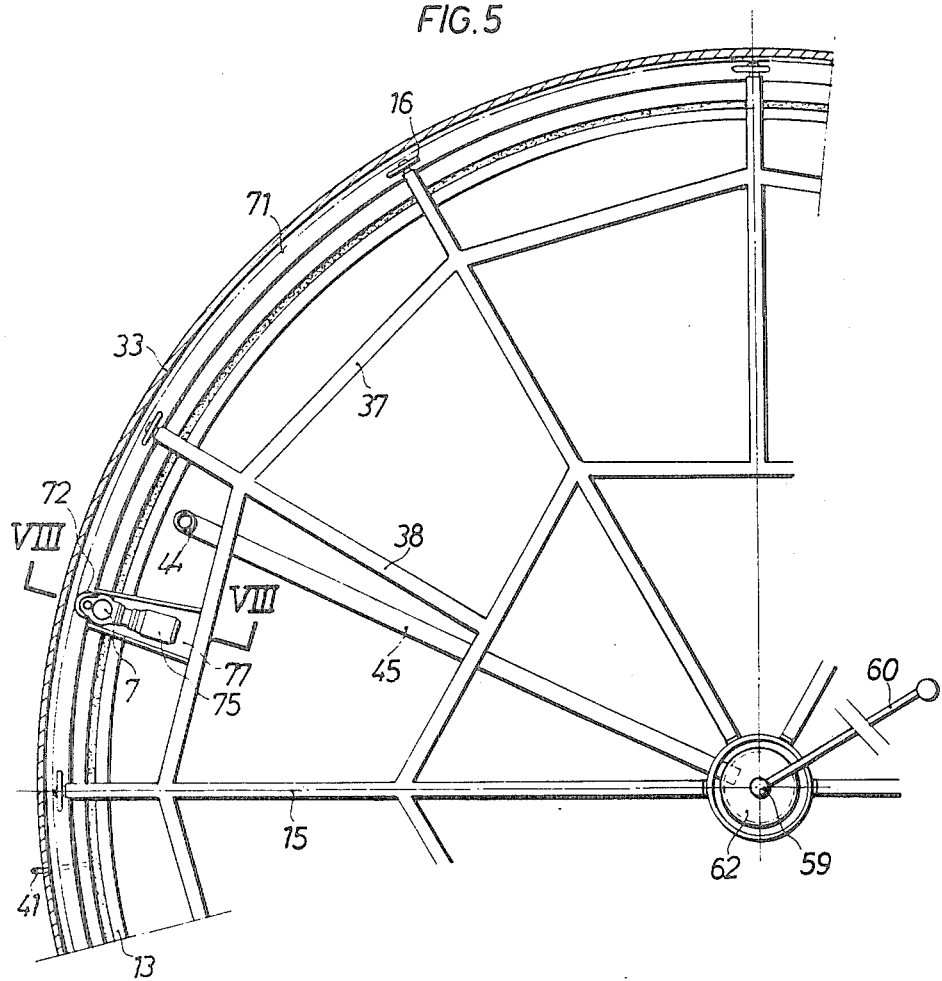
Figure 6:
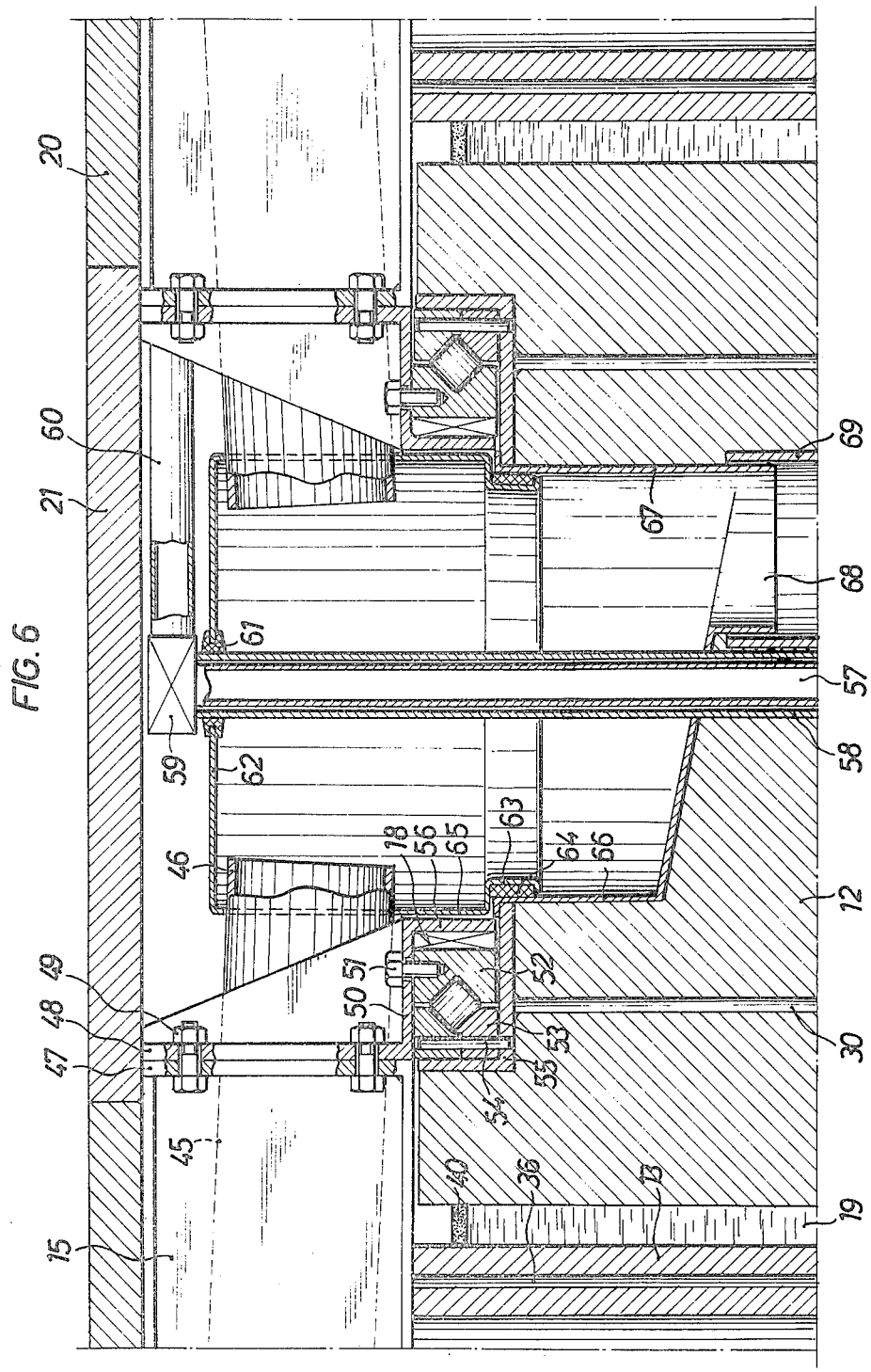
FIG. 6 is an enlarged detail of the central part of the ensemble, in which the functional coupling between the fixed and movable parts are seen.
Figure 7:
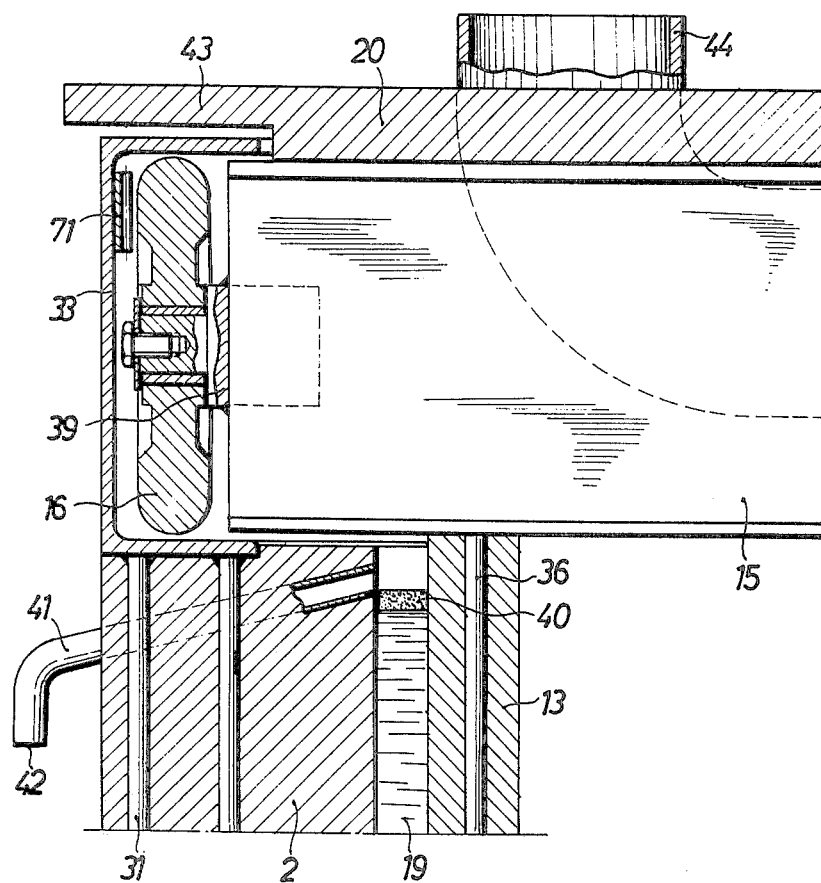
FIG. 7 is a detail, on the same scale, of the lateral and guiding part of the movable body.
Figure 8:
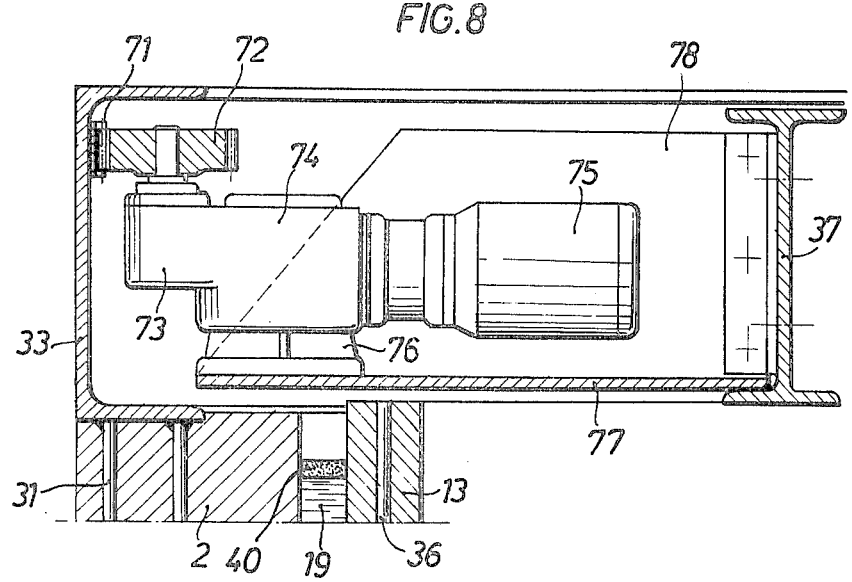
FIG. 8 represents the propulsion device of the movable body in relation to the fixed body, that is to say, the group motor-clutch-reducer and its cinematic junction with the corresponding part of the static body.

In FIG. 8 is shown with number -71- a toothed rack, mounted fixedly in the interior surface of the profile -33-, geared to it the teeth of a wheel -72- mounted on the shaft of the reducing gear -73-, which is coupled cinematically to the clutch -74- which will be preferably of the hydraulic type and will be driven by an electric motor -75-, in such a way that the said power group remains mounted on its base -76- in the plate -77-, in the form of a grooved box, whose faces -78- are situated in a radial direction, as is understood from FIG. 5. The power group will be sustained between the crosspiece -36-, for example, and the periphery of the movable body.

The feed device of the electric motor -75- has a component charged to interrupt the current in case that said motor shall be obliged to give a thrust greater than that foreseen, for example through an excessive increase of the charge represented by the turning of the movable part, due to an abnormal additional resistance or other unforeseen circumstance upon stoppage of the motor a revision of the structure may be proceeded with, to determine the cause of this.

Figure 9:
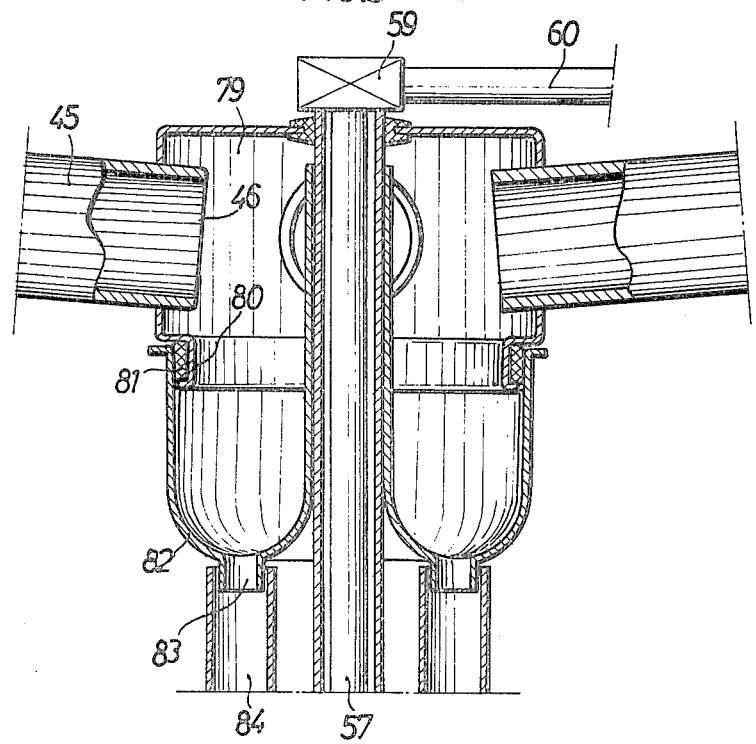
FIG. 9 shows another manner of carrying out the elimination of residual waters, different from that shown in FIG. 4, although within the same general idea.

FIG. 9 represents a variant of the terminal nozzle device of the drainage tubes -45-, whose mouths -46- are introduced into the cylindrical body 79. Its lower part 80 with an elastic seal -81- joins the head of the body -82-, forming a central tubular base which is arranged around the axial conduit -57-, whilst the nozzles -83-, disposed in the lower parts of that base, communicate with tubes of elimination -89- connected with an outlet collector.

In adequate places in the structure, and conveniently separated, there will be observation peepholes to check the level of the sustaining liquid -19- and of the coat of non-volatile liquid -40- which floats on it nest to these peepholes will be indicated, by means of reference strokes, the normal levels of no charge and maximum charge.

The same type of structure as that described may support a larger or a smaller load, according to the density of the intermediate liquid -19-; therefore, if an increase of that magnitude is foreseen, it is sufficient to substitute the liquid actually used by another of greater density. All this is in accordance with the Archimedes principle, on which the working of the installation is based. As examples of usable liquids we may quote, besides water, the solution of calcium nitrate, potassium iodide, zinc chloride and even mercury, a liquid metal of high density (13.6), which allows the sustenance of very important loads.

If, for a determine reason, an offcentering of the load is observed, which gravitates on a movable platform of the type described, this may be corrected by means of the addition of ballast in the appropriate part, until the proper compensation of the loads and the levelling of the platform is achieved.

The inlet of the electrical energy required for the different applications in the structure or construction mounted on the platform -20- or -26- is carried out analogously through the central part of the same, by means of a contact device which permits the rotation of the movable part without affecting the supply of current.

The electrical circuit of the motor -75- will also comprise a timer device designed to regulate the periods of working of the former, that is to say, the turning of the movable part of the structure. This allows, for example, to match the rotation of the basis of a building of dwellings or a chalet to the rotation of the sun on the horizon, so as to achieve the maximum insulation, or to rotate an industrial or commercial structure in accordance with its functional characteristics.

For the introduction of the liquid -19- into the insulation, an arrangement of conduits -85- has been provided, whose inlets -86- are joined to feed valves -87-, while its inlet to the structure is made from the end -88- in an adequately situated bottom zone. The emptying of the liquid will take place through the conduit -89-. Also in communication with an adequate zone of the installation itself, The filling device may carry a buoy associated with the inlet conduit, which permits to obtain automatically an almost constant level of liquid.

Register-lids will allow the checking, when desired, of the state of the central mechanisms, driving unit, liquid level, conduits, etc.

It is interesting to point out that, by means of the arrangement of the necessary number of intermediate supports according to FIG. 3, structures of great dimensions may be carried. For example, for the construction of spaces for the parking of vehicles, that is to say, parks, in circular or polygonal form, in which there will be several concentric circular crowns for occupation by automobiles, situated in trapezoidal sectors marked in the same. This would permit storage of a large number of vehicles with a drastic reduction of the dead space necessary for the maneuverability of the same, which brings about an increase in the storage capacity and, in consequence, in the efficiency of the installation.

As new examples of the application of the structure described, we quote the construction of hotels, watch towers and tourist restaurants, terraces, theatre stages and circus rings, bases for turning railway wagons, and military installations.

I claim:

1. In combination: a fixed body having a peripheral portion, a hollow chamber, and central vertical axis, a liquid partially filling said chamber, a movable body floatingly received in the liquid in said chamber, and having a central vertical axis, and a rotary support structure for supporting loads to be rotated, said support structure including means supported on said peripheral portion for circular movement thereover about said central vertical axis.

2. The combination of claim 1, wherein said fixed body comprises central support means for said rotary structure.

3. The combinaton of claim 2, comprising track means on said annular support means.

4. The combination of claim 3, in which said support structure comprises a plurality of wheels received in said track means.

5. The combination of claim 2, which comprises coupling means between said central support means of said fixed body and said rotary support structure, said coupling means including a first plate connected to said fixed body and a second plate connected to said rotary structure, and bearing means arranged between said first and second plates.

6. The combination of claim 2, comprising conduit means in said central support means, and distributor pipe means in said rotary support structure, and valve means interposed between said conduit means and said distributor pipe means, whereby said rotary support structure may be supplied with liquid from said fixed body.

7. The combination of claim 6 comprising a plurality of conduits disposed radially in said rotary support structure, collecting means communicating with said plurality of conduits and provided in said rotary structure, a fixed box associated with said central support means of said fixed body, and water-tight coupling means between said boxes for discharging liquid from said plurality of conduits to said fixed box.

8. The combination of claim 1, comprising annular support means connected to and within said fixed body for supporting said support structure.

9. The combination of claim 1, in which said support structure comprises a plurality of wheels with substantially horizontally extending axes and movable on said peripheral portions, substantially radially extending beams connected to said support structure and having connected thereto said wheels.

10. The combination of claim 1, comprising a non-volatile liquid on the free surface of said liquid in said chamber.

11. The combination of claim 1, comprising conduit means leading into said chamber above the surface of said liquid for removing excess liquid.

12. The combination of claim 1, comprising propulsion means for said movable body, including motor means and transmission means connected between said motor means and said movable body in said fixed body for rotating said movable body about said central vertical axis.

* * * * *